No. 637,277. Patented Nov. 21, 1899.
C. OLSON.
COMPOSITE SOFT TREAD.
(Application filed Feb. 16, 1899.)
(No Model.)
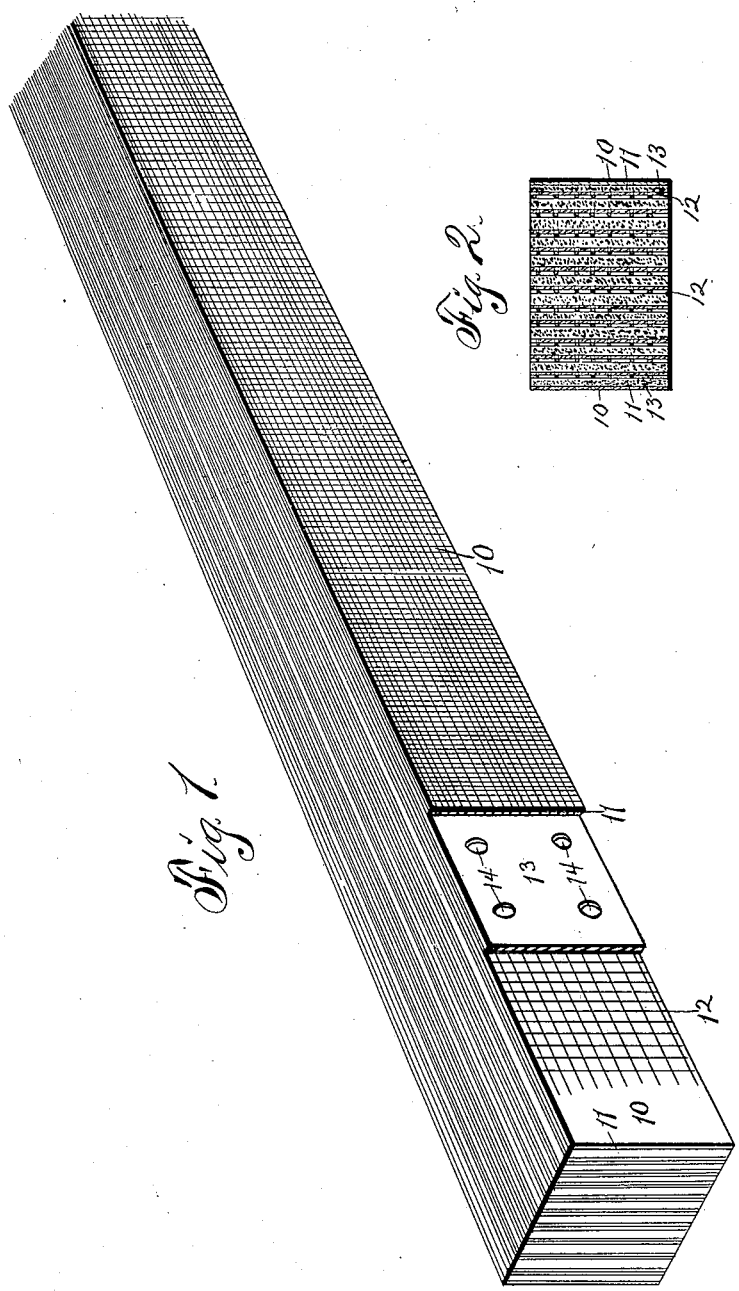

UNITED STATES PATENT OFFICE.

CHARLES OLSON, OF DES MOINES, IOWA, ASSIGNOR OF ONE-HALF TO HENRY LAGERQUIST, OF SAME PLACE.

COMPOSITE SOFT TREAD.

SPECIFICATION forming part of Letters Patent No. 637,277, dated November 21, 1899.

Application filed February 16, 1899. Serial No. 705,739. (No model.)

*To all whom it may concern:*

Be it known that I, CHARLES OLSON, a citizen of the United States of America, and a resident of Des Moines, Polk county, Iowa, have invented certain new and useful Improvements in Composite Soft Treads, of which the following is a specification.

The object of this invention is to provide an improved block to be employed in the formation of soft treads for horseshoes.

My invention consists in the construction of an article of manufacture, as hereinafter set forth, pointed out in my claims, and illustrated by the accompanying drawings, in which—

Figure 1 is a perspective illustrating an article formed of my ingredients. Fig. 2 is a cross-section of the article shown in Fig. 1.

In the construction of the article as shown I employ layers or sheets of textile fabric 10, india-rubber 11, and mesh-wire 12, arranged in successive layers to the desired thickness and vulcanized into the nearest approach possible to attain to a homogeneous mass. To the outer surface of the last layer or strip of rubber I attach a strip of textile fabric. For the purpose of stiffening the article and rendering the same less liable to abrasion and crushing I may interpose between the outer layers of the article and the layers next adjacent thereto plates 13, of thin steel, and provided with apertures or perforations 14, through which the sheets of rubber may meet the textile fabric and be adhered thereto during the process of vulcanizing. I cut the composite strip thus formed into sections or blocks of the desired length and bend and shape said sections or blocks as required for mounting in or on horseshoes to provide soft treads therefor. I prefer to use the sections or blocks with the faces or layers thereof perpendicular to the tread-surfaces on which they travel, as in this manner of use the rubber and textile portions will protrude slightly beyond the metallic portions, will abrade and spread across the metallic portions, and furnish a soft and noiseless tread for impact with the tread-surfaces. By the foregoing it is meant that the metallic portions of the composite soft tread will wear and the textile and rubber portions will abrade, ravel, scuff, and cover the edges of the metallic portions, but will not mash nor spread to as great an extent as would be the case if the metallic portions were omitted, and at the same time the frayed and abraded face formed by the textile and rubber portions will project beyond the metallic portions and furnish a cushion-tread for impact prior to the engagement of the metallic portions. I contemplate the manufacture of a block composed almost entirely of the woven-wire sheets on edge, enough of the rubber or rubber and textile substances being employed to hold the wire sheets together and provide a cushion therefor. The metallic sheets, either of wire fabric or perforated steel plates, will stiffen the sections or blocks, and the edges thereof will wear back slowly and protect the softer substances from rapid wearing.

I claim as my invention—

1. The composite block for horseshoes, comprising the successive layers of fabric, india-rubber and wire fabric vulcanized together and arranged with the surfaces thereof perpendicular to the tread-surfaces on which they travel.

2. The composite block for horseshoes, comprising parallel plane sheets of wire-cloth and cohesive and cushioning substances such as rubber and cloth intermixed and vulcanized therewith, the edges of the sheets of wire-cloth and cohesive substances forming a tread-surface.

Signed by me, at Des Moines, Iowa, this 18th day of January, 1899.

CHARLES OLSON.

Witnesses:
HENRY LAGERQUIST,
S. C. SWEET.